United States Patent Office 3,360,574
Patented Dec. 26, 1967

3,360,574
PERCHLORINATED HYDROCARBON POLYMERS
AND THEIR PREPARATION
Manuel Ballester, % Department of Organic Chemistry,
University of Barcelona, Barcelona, Spain, and Juan
Castaner and Juan Riera, Barcelona, Spain; said Castaner and said Riera assignors to said Ballester
No Drawing. Filed Feb. 17, 1965, Ser. No. 433,508
Claims priority, application Spain, May 23, 1964, 300,179
6 Claims. (Cl. 260—649)

This invention relates to novel perchlorinated hydrocarbon polymers and their preparation. More particularly it relates to unsaturated perchlorinated hydrocarbon polymers and their preparation.

Many varieties of polymers are known and some have achieved commercial success in various applications such as films, fibers, coating compositions, and the like. While the known polymers have a diversity of properties or characteristics resulting from particular structural composition and molecular weight, new types of polymers are continuously being sought.

One object of this invention is to provide new types of polymers. Another object is to provide a method for their preparation. These and other objects will become apparent hereinafter.

The new polymers of this invention have repeating units of the general formula (1) $=\left[(CCl)_{2n+1}-Ar-(CCl)_{2n+1}\right]=$ wherein Ar is a perchloroarylene group, and $n$ is zero or one, i.e., a whole number of 0–1, inclusive. Alternatively, the repeating units of the general formula can be written as 1a) $=\left[CCl-(CCl=CCl)_n-Ar-(CCl=CCl)_n-CCl\right]=$ wherein $n$ and Ar are defined as above.

Most preferably, Ar is defined as a divalent group of the formula

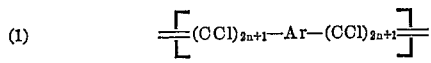

or

The novel polymers defined by Formula 1 or 1a can be prepared by starting with a compound of the general formula (2)    $Cl_3C-(CCl)_{2n}-Ar-(CCl)_{2n}-CCl_3$ which can be alternatively formulated as (2a)   $Cl_3C-(CCl=CCl)_n-Ar-(CCl=CCl)_n-CCl_3$ wherein Ar and $n$ have the same meanings indicated above, and polycondensing it under the action of a dechlorinating agent in a suitable medium, and under an inert atmosphere.

As dechlorinating agents, ferrous chloride or stannous chloride (either anhydrous or solvated) are preferred. Preferably, these agents are used in stoichiometric amounts, i.e., in the minimum proportion of four equivalents of the agent for each mole of the starting perchlorinated organic compound employed. An equivalent is defined as that amount of dechlorinating agent which removes one equivalent of chlorine from a mole of the perchlorinated starting material, i.e., one chlorine atom per molecule of starting material.

Especially preferred diluent media which can be employed include ethers such as ethyl ether, dioxane and tetrahydrofuran, or chloroform and tetrachloroethylene.

The reaction is conveniently carried out at temperatures ranging from 40° C. to 150° C., and preferably at temperatures of about 100° C.; however, temperature is not critical. Pressure is not critical and the reaction can be conducted at atmospheric pressure, although super- or sub-atmospheric pressures may be used. Nor is the time of reaction critical, although, generally reaction times of 3–24 hours are employed, with about 4–6 hours most preferred.

The reaction is conducted in the presence of an inert atmosphere such as nitrogen, argon or any well-known inert gas.

After obtaining the polymer from the reaction medium, it can subsequently be purified by conventional methods, e.g., by passing through activated alumina or other similar material, or by fractionation using suitable solvents such as ethyl ether, petroleum ether and chloroform.

If a mixture of two or more starting materials defined in Formula 2 or 2a are employed in the process of the invention, a copolymer of the reactants is obtained.

The novel polymers obtained by the process of the invention have molecular weights ranging from about 4,000 to about 27,000 or more.

The polymers of the invention and their preparation are illustrated in the following examples.

EXAMPLE 1

*Preparation of perchloropoly-p-xylenediylidene*

There is warmed at 100° C., in nitrogen, for five hours, a mixture containing 70 parts by weight of perchloro-p-xylene,

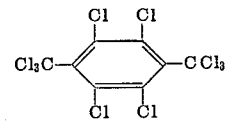

106 parts by weight of stannous chloride dihydrate, 3500 parts by weight of dioxane, and 175 parts by weight of chloroform. The reaction mass is diluted with water, and strongly acidified with hydrochloric acid (to avoid the hydrolysis of the chlorides of tin), whereupon the polymer formed is precipitated. The polymer is separated by filtration and is digested with ether to separate lower molecular weight fractions. The fraction insoluble in ether is digested with chloroform, thus obtaining a soluble fraction whose weight is 25 parts and an insoluble fraction whose weight is 10 parts. The soluble fraction is purified by passing it through activated alumina, previously having been dissolved in carbon tetrachloride. By means of carbon-hydrogen and chlorine analyses, as well as infrared and ultraviolet spectral absorption data, the structure of the repeating unit of the polymers obtained is confirmed, which is the following:

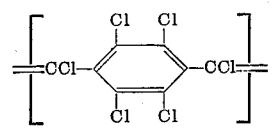

The polymers resist high temperatures without appreciable decomposition. For example, the fraction insoluble in chloroform is not sensibly decomposed at 450° C. (as shown by carbon-hydrogen and chlorine analyses and loss-in-weight determination).

The polycondensation of perchloro-p-xylene has been carried out similarly in an aqueous dioxane medium, employing ferrous chloride as dechlorinating agent, with analogous results.

EXAMPLE 2

*Preparation of perchloropoly-p-dipropenylbenzene-diylidene*

There is warmed at 100° C., for six hours and in a nitrogen atmosphere, a mixture containing 100 parts by weight of cis, anti, cis-perchloro-p-dipropenylbenzene,

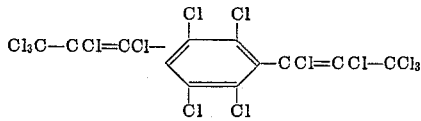

136 parts by weight of stannous chloride dihydrate, 250 parts by weight of chloroform, and 7500 parts by weight of dioxane. The reaction mass is poured into an aqueous solution of hydrochloric acid, e.g., 4 N, forming a precipitate which is washed with ethyl ether, subsequently dissolved in carbon tetrachloride and passed through activated alumina. Following elimination of volatile fractions there is obtained 70 parts by weight of a polymer, the structure of whose repeating unit is

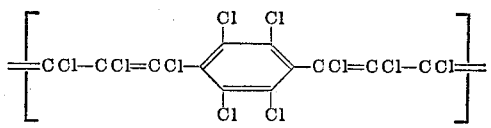

as proved by carbon-hydrogen and chlorine analyses, as well as by ultraviolet and infrared spectral data. The molecular weight, determined by osmometry, is of the order of 15,000.

EXAMPLE 3

*Preparation of perchloropoly-p-dipropenylbenzene-diylidene*

Following the procedure described in Example 2, but starting with the cis, syn, cis-isomer,

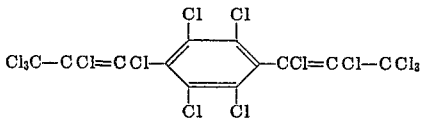

there is obtained a polymer having a molecular weight, determined by osmometry, of about 20,000, which is stable at 400° C.

EXAMPLE 4

*Preparation of perchloropoly-p-bitolyldiylidene*

There is warmed at 100° C., for four hours and in a nitrogen atmosphere, a mixture of 50 parts by weight of perchlorobi-p-tolyl,

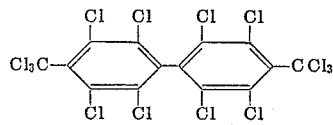

52 parts by weight of stannous chloride and 1200 parts of dioxane. The resulting mass is poured into 4 N hydrochloric acid. The precipitate formed is separated by filtration and treated with ether, leaving a residue of 32.5 parts by weight which is dissolved in carbon tetrachloride and purified by fractional precipitation with petroleum ether. The repeating unit of the polymer obtained has the structure

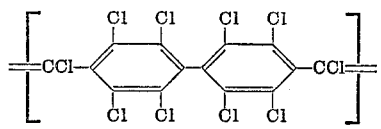

as shown by carbon-hydrogen and chlorine analyses, as well as by ultraviolet and infrared spectra data. Its molecular weight determined by osmometry, varies between 5000 for the most soluble fraction and 27,000 for the less soluble ones. The polymer resists temperatures of 400° C. without appreciable loss in weight and without alteration in the analytical data.

The polymers of the invention exhibit insignificant volatility and have good thermal stability (close to incipient red) which makes them useful as ingredients in fire-extinguishers, as flame arresters, water-proofers, high-pressure lubricants, dielectrics, or insulators, whether applied in bulk, fiber, powder, layer, sheath, impregnation, and the like, or entering in composition with other materials.

The perchlorinated starting reactants can be prepared as described in publication ARL 64–141, September 1964, U.S. Air Force, Office of Aerospace Research.

The foregoing description has been given for clearness of understanding and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A polymer having repeating units represented by the formula

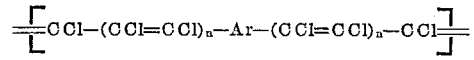

wherein $n$ is a whole number of 0–1, inclusive, and Ar is a perchloroarylene group.

2. The polymer of claim 1 wherein Ar is selected from the group consisting of

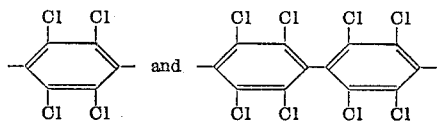

3. A polymer having repeating units represented by the formula

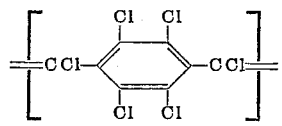

4. A polymer having repeating units represented by the formula

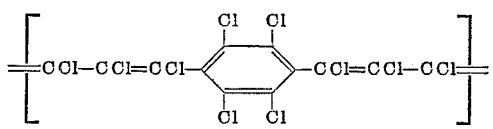

5. A polymer having repeating units represented by the formula

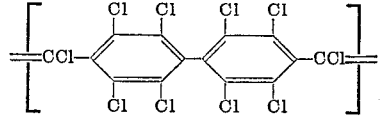

6. A process for preparing polymers having repeating units represented by the formula

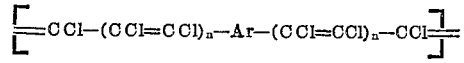

which comprises reacting a compound of the formula

wherein $n$ is a whole number of 0–1, inclusive and Ar is a perchloroarylene group, with a dechlorinating agent selected from the group consisting of ferrous chloride and stannous chloride, in a solvent medium and under an inert atmosphere, at a temperature of from about 40° C. to about 150° C.

References Cited

UNITED STATES PATENTS 2,644,835   7/1953   Ladd et al. _____ 260—658 X

LEON ZITVER, *Primary Examiner.*

N. J. KING, H. T. MARS, *Assistant Examiners.*